(12) United States Patent
Brown et al.

(10) Patent No.: US 12,400,224 B1
(45) Date of Patent: Aug. 26, 2025

(54) POLICY-BASED BLOCKCHAIN TRANSACTIONS

(71) Applicant: Gemini IP, LLC, New York, NY (US)

(72) Inventors: Cody Rafael Brown, Brooklyn, NY (US); Baron von Oldenburg, Shoreline, WA (US); William Parker Thompson, Seattle, WA (US)

(73) Assignee: Gemini IP, LLC, New York, NY (US)

( * ) Notice: Subject to any disclaimer, the term of this patent is extended or adjusted under 35 U.S.C. 154(b) by 111 days.

(21) Appl. No.: 18/095,300

(22) Filed: Jan. 10, 2023

(51) Int. Cl.
*G06Q 20/40* (2012.01)
*G06Q 20/38* (2012.01)

(52) U.S. Cl.
CPC ................... *G06Q 20/389* (2013.01)

(58) Field of Classification Search
None
See application file for complete search history.

(56) References Cited

U.S. PATENT DOCUMENTS

| | | | |
|---|---|---|---|
| 11,100,510 B1* | 8/2021 | Wyner | G06F 21/602 |
| 2018/0082296 A1* | 3/2018 | Brashers | H04L 9/3236 |
| 2019/0132350 A1* | 5/2019 | Smith | G06F 21/60 |
| 2019/0272534 A1* | 9/2019 | Griffith | G06Q 20/02 |
| 2019/0303932 A1* | 10/2019 | Klaedtke | H04L 9/0637 |
| 2019/0332702 A1* | 10/2019 | Manamohan | G06F 11/3006 |
| 2020/0118131 A1* | 4/2020 | Diriye | H04L 9/3239 |
| 2021/0166245 A1* | 6/2021 | Novotny | H04L 67/1078 |
| 2022/0103453 A1* | 3/2022 | Novotny | H04L 9/3239 |
| 2023/0092436 A1* | 3/2023 | Gaur | G06Q 20/0655 705/37 |

* cited by examiner

*Primary Examiner* — William J Jacob
(74) *Attorney, Agent, or Firm* — Lee & Hayes, P.C.

(57) ABSTRACT

Policy-based blockchain transactions include applying a policy-based framework to blockchain transactions, such as those involving the transfer or payment of cryptocurrency coins or tokens. In the various embodiments of the present disclosure, blockchain transactions that comply with one or more predefined policies will be approved for propagation or publication to a blockchain network, while cryptocurrency coin or token transactions that are not compliant will be rejected or prevented from propagating to the blockchain network.

17 Claims, 4 Drawing Sheets

POLICY-BASED BLOCKCHAIN TRANSACTIONS

BACKGROUND

Cryptocurrency coins and tokens can be used as payment between a multitude of parties. Moreover, any two parties can use a publicly accessible blockchain network to transfer cryptocurrency coins or tokens from one party to another. This can be done by direct transfers from the wallet address of the payer to the wallet address of the payee, or through the use of smart contracts that trigger payment or transfer of cryptocurrency coins or tokens in response to predefined triggering events occurring.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
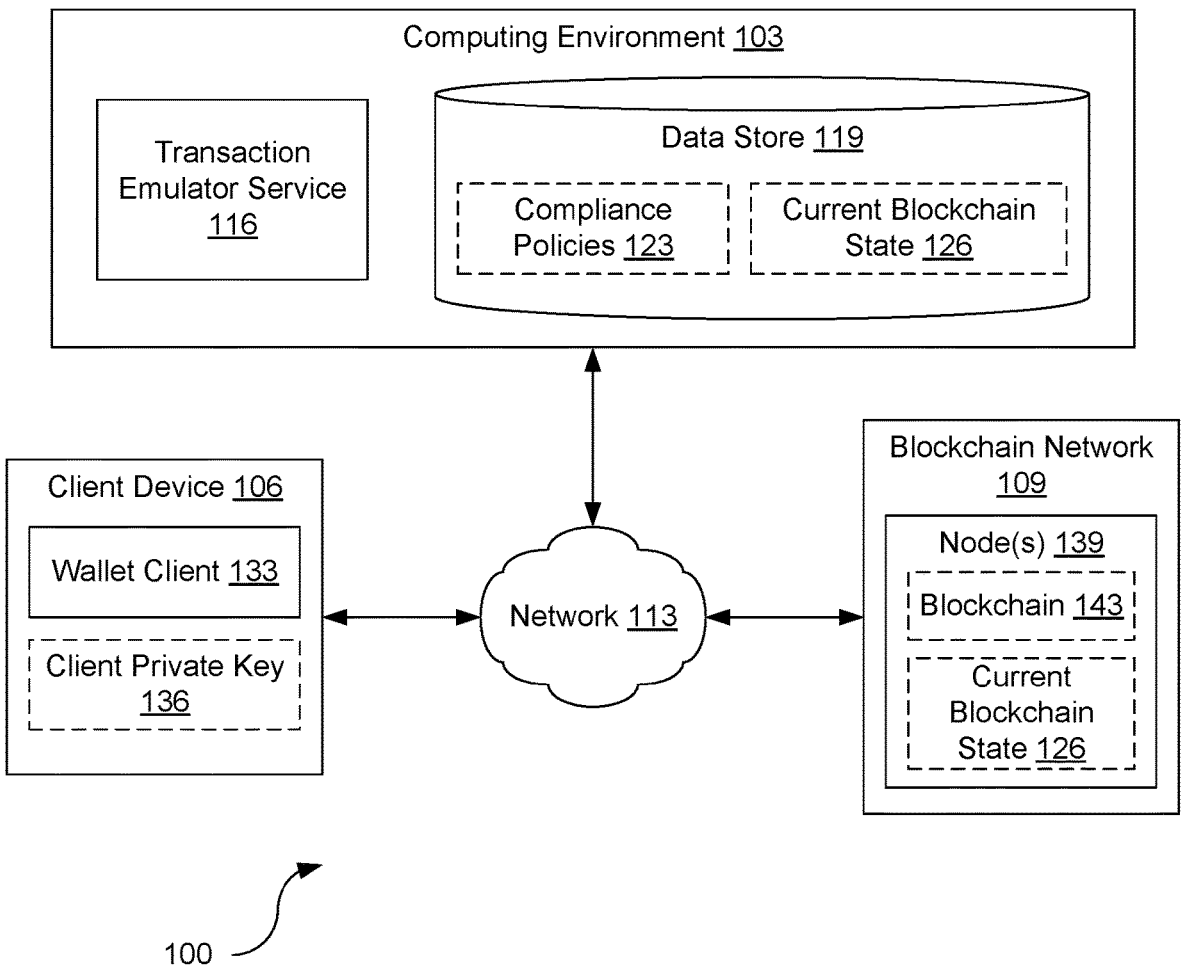
FIG. 1 is a drawing of a network environment according to various embodiments of the present disclosure.

Disclosed are various approaches for implementing policy-based blockchain transactions. Cryptocurrency coin or token payments typically have few, if any, inherent restrictions. For example, so long as a sufficient number of cryptocurrency coins or tokens are stored in a payer's wallet address, any transaction signed with the private key of the wallet address will be processed and approved by the respective blockchain network.

However, individuals or organizations may wish to restrict cryptocurrency coin or token payments based on various factors. For example, an organization may wish to avoid transacting with wallet addresses that are known to belong to internationally sanctioned individuals or entities or are known to be affiliated with criminal activities or enterprises. As another example, an organization may wish to prohibit transactions involving more than a predefined amount of cryptocurrency coins or tokens in order to avoid having funds drained if there were a security breach or compromise.

To solve these problems, various embodiments of the present disclosure apply a policy-based framework to blockchain transactions, such as those involving the transfer or payment of cryptocurrency coins or tokens. In the various embodiments of the present disclosure, blockchain transactions that comply with one or more predefined policies will be approved for propagation or publication to a blockchain network, while cryptocurrency coin or token transactions that are not compliant will be rejected or prevented from propagating to the blockchain network.

However, the effects of a blockchain transaction are not always known based on a static analysis of the data or metadata associated with a blockchain transaction. For example, a blockchain transaction could result in execution of code within a smart contract. However, it might not be apparent which blockchain addresses a smart contract would interact with unless the execution of the smart contract is analyzed. For example, a smart contract might transfer cryptocurrency coins or tokens from a first wallet address to a second wallet address by storing some portion of the cryptocurrency coins or tokens in an intermediate address. However, an analysis of the final state resulting from the blockchain transaction would not indicate the use of the third wallet address if the balance of the third wallet address did not experience a net change. Likewise, the third blockchain address might not be identified in the blockchain transaction or be readily apparent from a static review of the code of the smart contract. As a result, it is possible for a blockchain transaction to involve parties or actions that would not be acceptable to the payee.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

FIG. 1 depicts a network environment 100 according to various embodiments. The network environment 100 can include a computing environment 103, a client device 106, and a blockchain network 109, which can be in data communication with each other via a network 113.

The network 113 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 113 can also include a combination of two or more networks 113. Examples of networks 113 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include a transaction emulator service 116, and potentially other applications, services, processes, systems, engines, or functionality not discussed in detail herein.

Also, various data is stored in a data store 119 that is accessible to the computing environment 103. The data store 119 can be representative of a plurality of data stores 119, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 119 is associated with the operation of the various applications or functional entities described below. This data can include one or more compliance policies 123, the current blockchain state 126 of the blockchain network 109, and potentially other data.

A compliance policy 123 can represent a policy that defines the conditions in which a blockchain transaction is permitted to be or prohibited from being submitted to the blockchain network 109. A blockchain transaction submitted to the transaction emulator service 116 can be compared to the condition(s) specified by one or more compliance policies 123 to determine whether the blockchain transaction is a permitted or prohibited transaction. Although several examples of compliance policies 123 are disclosed in the following paragraphs, other compliance policies 123 are also encompassed by the various embodiments of the present disclosure.

For example, a compliance policy 123 could specify one or more blockchain addresses of the blockchain network 109 that are prohibited. Such a compliance policy 123 could be created to specify blockchain addresses that are known to be associated with fraudulent or criminal activity, are specified by a government entity as a prohibited or sanctioned address, etc. If the transaction emulator service 116 determines that a blockchain transaction would interact with one or more of the prohibited blockchain addresses specified in the compliance policy 123, then the blockchain transaction would be rejected by the transaction emulator service 116.

As another example, a compliance policy 123 could specify a transaction limit for a specified address or for the blockchain transaction generally. For instance, if blockchain transaction were to cause more than a specified amount of cryptocurrency coins or tokens to be sent from or received by the specified blockchain address, then the blockchain transaction could be rejected by the transaction emulator service 116. Similarly, if the blockchain transaction were to involve more than a specified amount of cryptocurrency coins or tokens, then the blockchain transaction could be rejected by the transaction emulator service 116.

In some implementations, a compliance policy 123 could also specify one or more rule-based heuristics that could be used to identity compliant or non-compliant blockchain transactions. For example, a compliance policy 123 could specify a decision tree containing one or more rules which, when evaluated, could determine that a blockchain transaction is a compliant or a non-compliant blockchain transaction. For instance, an organization could create a decision tree that specifies various characteristics of a blockchain transaction that are generally indicative of fraudulent or malicious blockchain transaction. Examples of these characteristics could include whether a blockchain transaction would draw down a wallet address by more than a predefined percentage, whether the blockchain transaction interacts with a smart contract that uses approved or prohibited libraries, whether the blockchain transaction interacts with a smart contract that fails to use best practices for programming or software development.

The current blockchain state 126 can represent the current state of the blockchain 143 stored on the blockchain network 109. This can include all account balances associated with all wallet addresses of the blockchain network, as well as other relevant data. In some implementations, the current blockchain state 126 can be regularly updated (e.g., by receiving the most recent block added to the blockchain 143). However, in other instances, the transaction emulator service 116 could query the blockchain network 109 for the current blockchain state 126 (e.g., when evaluating a blockchain transaction received from a wallet client 133). In these implementations, the current blockchain state 126 could be cached or stored in the data store 119.

As previously mentioned, the current blockchain state 126 can be stored in the data store 119 to improve the performance of the transaction emulator service 116. Instead of sending a query across the network 113 to the blockchain network for the state of the blockchain network 109, the transaction emulator service 116 can query the data store 119 to obtain the current blockchain state 126. However, the current blockchain state 126 of the blockchain network 109 can consume a large amount of storage space, so it may not be practical to store the current blockchain state 126 in the data store 119 in some implementations.

The transaction emulator service 116 can be executed to evaluate the effect of a blockchain transaction on the state of the blockchain network 109. The transaction emulator service 116 can include any application or service that, given a state of the blockchain network 109 and a blockchain transaction, can deterministically calculate the new state of the blockchain network 109 as a result of the blockchain transaction. The transaction emulator service 116 can also evaluate the blockchain transaction and/or the new state of the blockchain network 109 to determine whether the blockchain transaction would comply with or violate one or more compliance policies 123 using various static programming analysis or dynamic programming analysis techniques. In some implementations, the transaction emulator service 116 could include a blockchain virtual machine. For example, if the blockchain network 109 were the ETHEREUM blockchain network 109 (or an ETHEREUM compatible blockchain network 109), then the transaction emulator service 116 could include an implementation of the Ethereum Virtual Machine (EVM).

The client device 106 is representative of a plurality of client devices that can be coupled to the network 113. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

Various applications and data can be stored on the client device 106. For example, the client device 106 can be configured to execute various applications such as a wallet client 133 or other applications. The client device 106 can also store information such as a client private key 136.

The wallet client 133 can be executed to allow the client device 106 to interact with the nodes 139 of the blockchain network 109. The wallet client 133 can be executed to send cryptocurrency coins or tokens from a user's wallet address to a specified wallet address, to view the amount of cryptocurrency coins or tokens that the blockchain 143 has recorded as being associated with the user's wallet address, or to sign transactions associated with the user's wallet address using a client private key 136, which may be stored on the client device 106. Examples of wallet clients 133 include METAMASK, EXODUS Wallet, etc. In some implementations, the wallet client 133 can be configured to send or submit blockchain transactions to the transaction emulator service 116 instead of directly to a node 139 of the blockchain network 109. In other implementations, however, the wallet client 133 could be configured to send or submit blockchain transactions to a specific or predefined node 139 of the blockchain network 109.

The blockchain network 109 represents a peer-to-peer network of nodes 139 that utilizes a consensus protocol to maintain an immutable, append only, eventually consistent data store such as a blockchain 143. Examples of blockchain networks 109 include the BITCOIN network, the LITECOIN network, the ETHEREUM network, the SOLANA network, the CARDANO network, the ALGORAND network, etc.

Nodes 139 of the blockchain network 109 can represent computing devices and/or virtual machines that maintain a copy of the blockchain 143 and all transactions submitted to the blockchain network 109 for inclusion in the blockchain 143. In some blockchain networks 109, individual nodes 139 can perform specialized functions, such as creating or validating new blocks for the blockchain 143 (sometimes referred to as "mining"), storing a copy of the current blockchain state 126 for the blockchain 143, responding to requests for the current state of the blockchain 143, etc. In other blockchain networks 109, one or more of these functions to be performed by the same node 139.

The blockchain 143 can represent an immutable, append only, eventually consistent distributed data store maintained by a plurality of nodes 139 in a peer-to-peer network that maintain duplicate copies of data stored in the blockchain 143. The nodes of the blockchain network 109 can use a variety of consensus protocols to coordinate the writing of data written to the blockchain 143. In order to store data to the blockchain 143, such as a record of a transaction of cryptocurrency coins or tokens between wallet addresses, users can pay cryptocurrency coins or tokens to one or more of the nodes 139 of the blockchain 143.

In some implementations, smart contracts can be stored on the blockchain 143. A smart contract can represent executable computer code that can be executed by a node 139 of the blockchain network 109. In many implementations, the smart contract can expose one or more functions that can be called by any user or by a limited set of users. To execute one or more functions of a smart contract, an application can submit a request to a node 139 of the blockchain network 109 to execute the function. The node 139 can then execute the function and store the result to the blockchain 143. Nodes 139 may charge fees in the form of cryptocurrency coins or tokens to execute a function and store the output, with more complicated or extensive functions requiring larger fees. An example of this implementation is the ETHEREUM blockchain network, where users can pay fees, referred to as "gas," in order to have a node of the ETHEREUM blockchain network execute the function and store the result to the ETHEREUM blockchain. Additionally, the more "gas" a user pays, the more quickly the function will be executed and its results committed to the ETHEREUM blockchain.

Next, a general description of the operation of the various components of the network environment 100 is provided. Although the following descriptions provides one example of the interactions between the various components of the network environment 100, other interactions are also encompassed by the various embodiments of the present disclosure.

To begin, a wallet client 133 creates a blockchain transaction for the blockchain network 109 and signs it with the client private key 136. The blockchain transaction can include information such as the amount of cryptocurrency coins or tokens for the transaction, the source wallet address, and the destination wallet address. If the blockchain transaction involves invoking or calling a function provided by a smart contract on the blockchain network 109, then the blockchain transaction could also specify the wallet address for the smart contract and the function identifier for the function of the smart contract. Other metadata can also be included in the blockchain transaction as appropriate for individual implementations of the present disclosure.

The wallet client 133 can then send the blockchain transaction across the network 113 to the transaction emulator service 116 hosted by the computing environment 103. The wallet client 133 may be preconfigured to send the blockchain transaction to the transaction emulator service 116 of the computing environment 103 instead of a node 139. This could be done, for example, to ensure that only those blockchain transactions that comply with one or more compliance policies 123 are stored or recorded on the blockchain 143.

The transaction emulator service 116 can evaluate the blockchain transaction and emulate the effect of the blockchain transaction on the state of the blockchain 143. This could be done using a variety of approaches. For example, a simple transfer of cryptocurrency coins or tokens from one wallet address to another wallet address could be emulated by adjusting the balances associated with the specified wallet address. As another example, if the blockchain transaction involved execution of a function provided by a smart contract, the transaction emulator service 116 could execute the blockchain transaction using a blockchain virtual machine. Dynamic programming analysis could be used by the transaction emulator service 116 during the execution of the blockchain transaction to identify its interactions with the blockchain 143. Moreover, the resulting state from the blockchain transaction could also be evaluated by the transaction emulator service 116 to determine the effect of the blockchain transaction on the state of the blockchain 143.

The transaction emulator service 116 can then determine whether the resulting state from the execution of the blockchain transaction satisfies or fails to satisfy one or more compliance policies 123. For example, the transaction emulator service 116 could determine whether the data or metadata of the blockchain transaction would violate one or more compliance policies 123. As another example, the transaction emulator service 116 could determine whether the blockchain transaction causes a compliance policy 123 to be violated during the course of execution of the blockchain transaction. The transaction emulator service 116 could also determine whether the final, emulated state of the blockchain 143 would violate a compliance policy 123 if the blockchain transaction were to be processed by the blockchain network 109 itself.

The transaction emulator service 116 could then process the blockchain transaction based at least in part on whether the blockchain transaction complies with all of the compliance policies 123. If the blockchain transaction complies with all of the compliance policies 123, then the transaction emulator service 116 could forward the blockchain transaction on to a node 139 of the blockchain network 109. The node 139 could then process the blockchain transaction and update the blockchain 143 to reflect the result of the blockchain transaction. However, if the blockchain transaction fails to comply with at least one of the compliance policies 123, the transaction emulator service 116 could reject the blockchain transaction.

Figure 2:
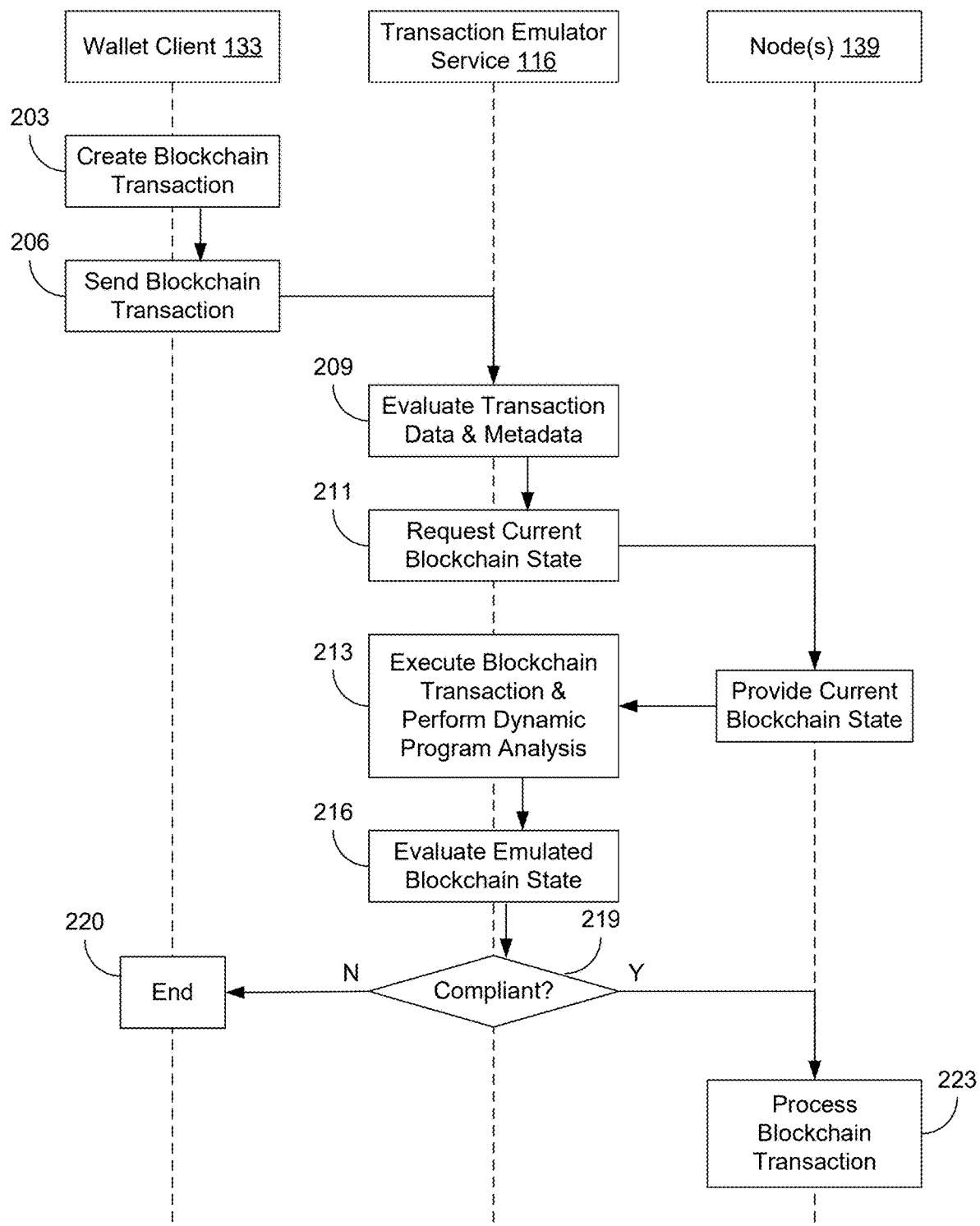
FIG. 2 is a sequence diagram depicting one example of the interactions between the various components of the network environment of FIG. 1.

Referring next to FIG. 2, shown is a sequence diagram that provides one example of the operations of and interactions between the wallet client 133, the transaction emulator service 116, and a node 139 of the blockchain network 109. The sequence diagram of FIG. 2 provides merely an example of the many different types of functional arrangements that can be employed to implement the operations of the depicted portions of the wallet client 133, the transaction emulator service 116, and the node 139 of the blockchain network 109. As an alternative, the sequence diagram of FIG. 2 can be viewed as depicting an example of elements of a method implemented within the network environment 100.

Beginning with block 203, the wallet client 133 can create a blockchain transaction and sign the blockchain transaction with the client private key 136. This could happen in response to a number of events. For example, a user could choose to send funds to a recipient, and the wallet client 133 could create a blockchain transaction that would cause cryptocurrency coins or tokens to be sent from a user wallet address to a recipient wallet address. As another example, a user could choose to execute or invoke a function provided by a smart contract, and the wallet client 133 could create a blockchain transaction that would cause the function of the smart contract to be executed.

Then, at block 206, the wallet client 133 can send the blockchain transaction to the transaction emulator service 116. For example, the wallet client 133 could be configured to submit all blockchain transactions to the transaction emulator service 116 for regulatory and compliance purposes.

Next, at block 209, the transaction emulator service 116 can first evaluate the data and metadata associated with the blockchain transaction to determine if the blockchain transaction violates one or more of the compliance policies 123. For example, the transaction emulator service 116 could compare the addresses specified in the blockchain transaction with one or more compliance policies 123 to determine if the blockchain transaction involves any prohibited addresses. As another example, the transaction emulator service 116 could compare the amount of cryptocurrency coins or tokens specified by the blockchain transaction to one or more compliance policies 123 to determine whether the blockchain transaction exceeds an approved transaction limit.

Optionally, at block 211, the transaction emulator service 116 can request the current blockchain state 126 from the blockchain network 109. This step can be avoided if, for example, the current blockchain state 126 is already stored or cached in the data store 119. In those implementations, the current blockchain state 126 stored in the data store 119 could be continuously updated via a separate process or mechanism.

Then, at block 213, the transaction emulator service 116 can execute the blockchain transaction using a blockchain virtual machine and compare the behavior of the blockchain virtual machine during execution to one or more compliance policies 123. This could be done, for example, by providing the blockchain transaction and the current blockchain state 126 as inputs or arguments to a blockchain virtual machine instance (e.g., the ETHEREUM virtual machine (EVM)) implemented or hosted by the transaction emulator service 116. The result of the execution of the blockchain transaction can be an emulated state of the blockchain 143. The emulated state is considered to be emulated insofar as it is not propagated or stored by the blockchain network 109 as the official state, but is instead used by the transaction emulator service 116 as reference for the predicted state of the blockchain network 109 that would result from the blockchain transaction being submitted to a node 139 of the blockchain network.

As part of the execution blockchain virtual machine, the behavior of the blockchain virtual machine, and by extension the behavior of blockchain transaction, can be analyzed using dynamic programming analysis. For example, each blockchain address that would be involved to complete the blockchain transaction can be identified, such as blockchain addresses invoked by a smart contract function executed as a result of the blockchain transaction. The runtime behavior of the blockchain virtual machine can then be analyzed to determine whether the blockchain transaction, if executed by the blockchain network 109, would violate one or more of the compliance policies 123 (e.g., involving a wallet address that is listed by a compliance policy as a prohibited wallet address).

Subsequently, at block 216, the emulated blockchain state resulting from execution of the blockchain transaction at block 213 can be analyzed by the transaction emulator service 116 and compared to one or more compliance policies 123. For example, the emulated blockchain state could be compared to the previous current blockchain state 126 to determine which blockchain addresses have experienced a change in a cryptocurrency coin or token balance, which would serve as an indicator of the blockchain addresses involved in execution of the blockchain transaction and as an indicator of the amount of cryptocurrency that was processed or transferred from one wallet address to another wallet address as a result of the blockchain transaction.

Then, at block 219, the transaction emulator service 116 can determine whether the blockchain transaction violated any of the compliance polices 123 during the analysis performed at any of blocks 209, 213, or 216. If the transaction emulator service 116 determines that the blockchain transaction violated one or more of the compliance policies 123, then the process can end at block 220 and an error message can be returned to the wallet client 133. The error message could indicate that the blockchain transaction was not forwarded on to a node 139 of the blockchain network 109. The error message could also include the reason, such as that the blockchain transaction would violate one or more compliance policies 123 and the reason why the blockchain transaction would violate the compliance policies 123.

However, if the transaction emulator service 116 determines that the blockchain transaction complies with all of the compliance policies 123, then the transaction emulator service 116 can forward the blockchain transaction on to a node 139 of the blockchain network 109. But in some implementations, the transaction emulator service 116 could proceed to block 223 even if the transaction emulator service 116 determines that the blockchain transaction violated one or more of the compliance policies 123. For example, the transaction emulator service 116 could be configured to send an error message to the wallet client 133 or some other service that indicates that the blockchain transaction violated one or more compliance policies 123, but still allow the blockchain transaction to proceed.

Subsequently, at block 223, the node 139 can process the blockchain transaction and record the results in the later block added to the blockchain 143.

Figure 3:
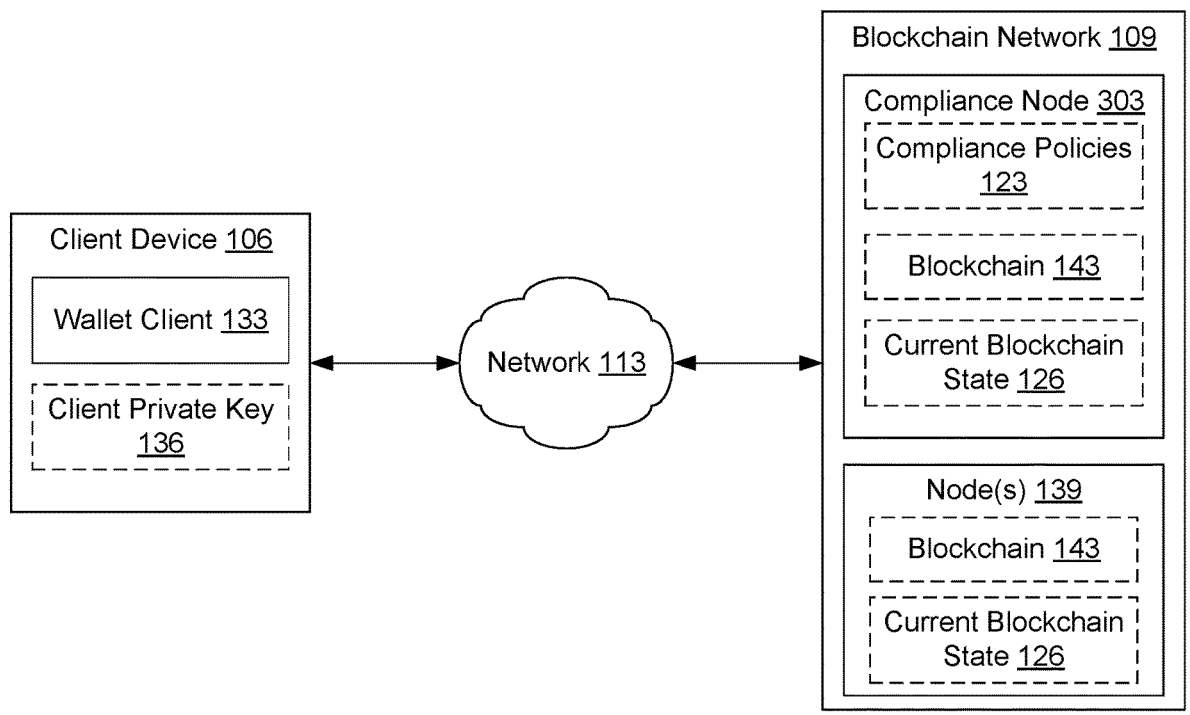
FIG. 3 is a drawing of a network environment according to various embodiments of the present disclosure.

FIG. 3 depicts another example of a network environment 300 according to various embodiments of the present disclosure. Similar to the network environment 100 of FIG. 1, the network environment 300 of FIG. 3 can include a client device 106 and a blockchain network 109, which can be in data communication with each other via a network 113. The client device 106 can include a wallet application 133 and a client private key 136, while the blockchain network 109 can include one or more nodes 139 that include a copy of the blockchain 143.

Unlike the network environment 100, the blockchain network 109 of the network environment 103 can also include one or more compliance nodes 303. Each compliance node 303 can operate like a node 139, including having a copy of the blockchain 143 and the current blockchain state 126. However, a compliance node 303 can also be configured to perform many of the same or similar functions as those implemented by the transaction emulator service 116. In addition, a compliance node 303 can also store one or more compliance policies 123.

The transaction emulator service 116 could be executed or implemented by a compliance node 303 in order to improve the performance of the transaction emulator service 116 compared to the network environment of FIG. 1. For example, the transaction emulator service 116 would always have access to the current blockchain 143, while in FIG. 1 the transaction emulator service 116 must either request the and receive the current blockchain state 126 over the network 113 from the blockchain network 109 or must cache the current blockchain state 126 in a locally accessible data store 119. As a result, the network environment of FIG. 3 reduces the latency experienced by the transaction emulator service 116 as it evaluates the current state of the blockchain 143 and reduces the amount of storage required by obviating the need to duplicate the current blockchain state 126 in the data store 119.

However, implementations such as those depicted in the network environment 300 of FIG. 3 require the deployment of customized compliance nodes 303 separate from unmodified nodes 139. In contrast, the network environment 100 of FIG. 1 does not require the creation and deployment of customized nodes 139 within the blockchain network 109 that the wallet client 133 must be configured to interact with. Accordingly, implementations such as those depicted in FIG. 1 may be simpler and easier to maintain because fewer customized components are required.

Next, a general description of the operation of the various components of the network environment 300 is provided. Although the following descriptions provides one example of the interactions between the various components of the network environment 300, other interactions are also encompassed by the various embodiments of the present disclosure.

To begin, a wallet client 133 creates a blockchain transaction for the blockchain network 109 and signs it with the client private key 136. The blockchain transaction can include information such as the amount of cryptocurrency coins or tokens for the transaction, the source wallet address, and the destination wallet address. If the blockchain transaction involves invoking or calling a function provided by a smart contract on the blockchain network 109, then the blockchain transaction could also specify the wallet address for the smart contract and the function identifier for the function of the smart contract. Other metadata can also be included in the blockchain transaction as appropriate for individual implementations of the present disclosure.

The wallet client 133 can then send the blockchain transaction across the network 113 to the transaction emulator service 116 of the compliance node 303. The wallet client 133 may be preconfigured to send the blockchain transaction to the compliance node 303 instead of a generic node 139. This could be done, for example, to ensure that only those blockchain transactions that comply with one or more compliance policies 123 are stored or recorded on the blockchain 143.

The transaction emulator service 116 can evaluate the blockchain transaction and emulate the effect of the blockchain transaction on the state of the blockchain 143. This could be done using a variety of approaches. For example, a simple transfer of cryptocurrency coins or tokens from one wallet address to another wallet address could be emulated by adjusting the balances associated with the specified wallet address. As another example, if the blockchain transaction involved execution of a function provided by a smart contract, the transaction emulator service 116 could execute the blockchain transaction using a blockchain virtual machine. Dynamic programming analysis could be used by the transaction emulator service 116 during the execution of the blockchain transaction to identify its interactions with the blockchain 143. Moreover, the resulting state from the blockchain transaction could also be evaluated by the transaction emulator service 116 to determine the effect of the blockchain transaction on the state of the blockchain 143.

The transaction emulator service 116 can then determine whether the resulting state from the execution of the blockchain transaction satisfies or fails to satisfy one or more compliance policies 123. For example, the transaction emulator service 116 could determine whether the data or metadata of the blockchain transaction would violate one or more compliance policies 123. As another example, the transaction emulator service 116 could determine whether the blockchain transaction causes a compliance policy 123 to be violated during the course of execution of the blockchain transaction. The transaction emulator service 116 could also determine whether the final, emulated state of the blockchain 143 would violate a compliance policy 123 if the blockchain transaction were to be processed by the blockchain network 109 itself.

The transaction emulator service 116 could then process the blockchain transaction based at least in part on whether the blockchain transaction complies with all of the compliance policies 123. If the blockchain transaction complies with all of the compliance policies 123, then the compliance node 303 could process the blockchain transaction and update the blockchain 143 to reflect the result of the blockchain transaction. However, if the blockchain transaction fails to comply with at least one of the compliance policies 123, the transaction emulator service 116 could reject the blockchain transaction.

Figure 4:
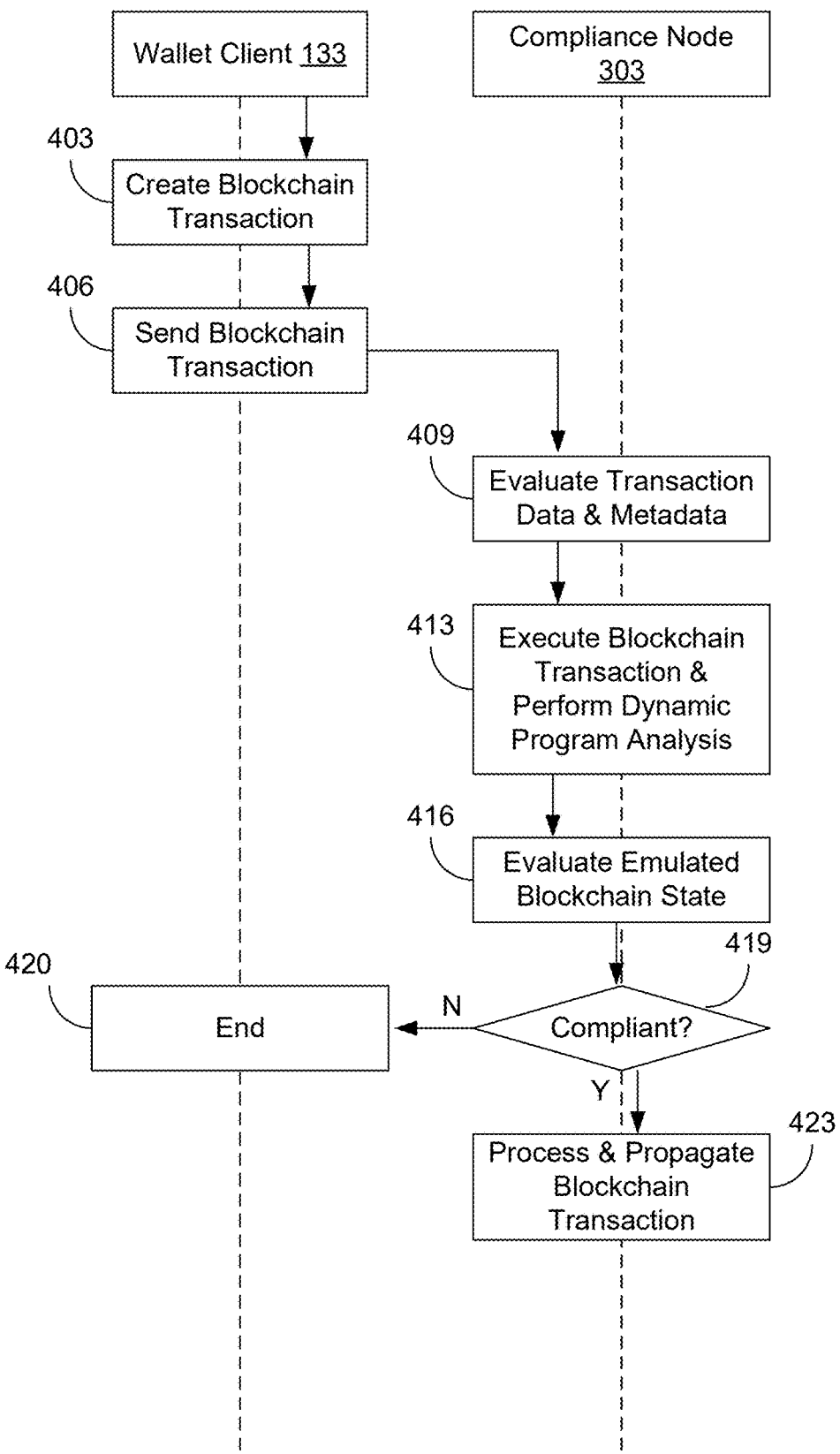
FIG. 4 is a sequence diagram depicting one example of the interactions between the various components of the network environment of FIG. 3.

Referring next to FIG. 4, shown is a sequence diagram that provides one example of the interactions between and the operations of a wallet client 133 and a compliance node 303. The sequence diagram of FIG. 4 provides merely an example of the many different types of functional arrangements that can be employed to implement the operations of the depicted portions of the wallet client 133 and the compliance node 303. As an alternative, the sequence diagram of FIG. 4 can be viewed as depicting an example of elements of a method implemented within the network environment 300.

Beginning with block 403, the wallet client 133 can create a blockchain transaction and sign the blockchain transaction with the client private key 136. This could happen in response to a number of events. For example, a user could choose to send funds to a recipient, and the wallet client 133 could create a blockchain transaction that would cause cryptocurrency coins or tokens to be sent from a user wallet address to a recipient wallet address. As another example, a user could choose to execute or invoke a function provided by a smart contract, and the wallet client 133 could create a blockchain transaction that would cause the function of the smart contract to be executed.

Then, at block 406, the wallet client 133 can send the blockchain transaction to the compliance node 303. For example, the wallet client 133 could be configured to submit all blockchain transactions to the compliance node 303 for regulatory and compliance purposes.

Next, at block 409, the compliance node 303 can first evaluate the data and metadata associated with the blockchain transaction to determine if the blockchain transaction violates one or more of the compliance policies 123. For example, the transaction emulator service 116 could compare the addresses specified in the blockchain transaction with one or more compliance policies 123 to determine if the blockchain transaction involves any prohibited addresses. As another example, the compliance node 303 could compare the amount of cryptocurrency coins or tokens specified by the blockchain transaction to one or more compliance policies 123 to determine whether the blockchain transaction exceeds an approved transaction limit.

Then, at block 413, the compliance node 303 can execute the blockchain transaction using a blockchain virtual machine and compare the behavior of the blockchain virtual machine during execution to one or more compliance policies 123. This could be done, for example, by providing the blockchain transaction and the current blockchain state 126 as inputs or arguments to a blockchain virtual machine instance (e.g., the ETHEREUM virtual machine (EVM)) implemented or hosted by the compliance node 303. The result of the execution of the blockchain transaction can be an emulated state of the blockchain 143. The emulated state is considered to be emulated insofar as it is not propagated or stored by the blockchain network 109 as the official state, but is instead used by the compliance node 303 as reference for the predicted state of the blockchain network 109 that would result from the blockchain transaction being submitted to a node 139 of the blockchain network.

As part of the execution blockchain virtual machine, the behavior of the blockchain virtual machine, and by extension the behavior of blockchain transaction, can be analyzed by the compliance node 303 using dynamic programming analysis. For example, each blockchain address that would be involved to complete the blockchain transaction can be identified, such as blockchain addresses invoked by a smart contract function executed as a result of the blockchain transaction. The runtime behavior of the blockchain virtual machine can then be analyzed to determine whether the blockchain transaction, if executed by the blockchain network 109, would violate one or more of the compliance policies 123 (e.g., involving a wallet address that is listed by a compliance policy as a prohibited wallet address).

Subsequently, at block 416, the emulated blockchain state resulting from execution of the blockchain transaction at block 413 can be analyzed by compliance node 303 and compared to one or more compliance policies 123. For example, the emulated blockchain state could be compared to the previous current blockchain state 126 to determine which blockchain addresses have experienced a change in a cryptocurrency coin or token balance, which would serve as an indicator of the blockchain addresses involved in execution of the blockchain transaction and as an indicator of the amount of cryptocurrency that was processed or transferred from one wallet address to another wallet address as a result of the blockchain transaction.

Then, at block 419, the compliance node 303 can determine whether the blockchain transaction violated any of the compliance polices 123 during the analysis performed at any of blocks 409, 413, or 416. If the compliance node 303 determines that the blockchain transaction violated one or more of the compliance policies 123, then the process can end at block 420 and an error message can be returned to the wallet client 133. The error message could indicate that the blockchain transaction was not forwarded on to a node 139 of the blockchain network 109. The error message could also include the reason, such as that the blockchain transaction would violate one or more compliance policies 123 and the reason why the blockchain transaction would violate the compliance policies 123.

However, if the compliance node 303 determines that the blockchain transaction complies with all of the compliance policies, then the process can proceed to block 423. But in some implementations, the compliance node 303 could proceed to block 423 even if the transaction emulator service 116 determines that the blockchain transaction violated one or more of the compliance policies 123. For example, the compliance node 303 could be configured to send an error message to the wallet client 133 or some other service that indicates that the blockchain transaction violated one or more compliance policies 123, but still allow the blockchain transaction to proceed.

At block 423, the compliance node 303 can cause the process the blockchain transaction and propagate the blockchain transaction to other nodes 139 in the blockchain network 109. For example, the compliance node 303 could add the blockchain transaction to a next block to be included in the blockchain 143, and other nodes 139 could do the same. As a result, the blockchain transaction and the effects of the blockchain transaction could be stored in the blockchain 143.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
    a computing device comprising a processor and a memory; and
    machine-readable instructions stored in the memory that, when executed by the processor, cause the computing device to at least:
        obtain a first transaction for a blockchain;
        emulate, by a compliance node of the blockchain, execution of the first transaction based at least in part on a current state of the blockchain to generate an emulated state of the blockchain, wherein emulating execution of the first transaction includes causing the compliance node to access other nodes of the blockchain without utilizing a cached blockchain state;
        determine that the emulated state of the blockchain complies with one or more compliance policies;
        in response to a determination that the emulated state of the blockchain as determined by the compliance node of the blockchain complies with the one or more compliance policies, forward the first transaction to a blockchain node for execution, wherein forwarding the first transaction causes the blockchain node to execute the first transaction;
        obtain a second transaction for the blockchain;
        emulate, by the compliance node of the blockchain, execution of the second transaction based at least in part on the current state of the blockchain, wherein emulating execution of the second transaction includes causing the compliance node to access the other nodes of the blockchain without utilizing the cached blockchain state;
        determine that the emulated state of the blockchain does not comply with the one or more compliance policies; and
        in response to a determination that the emulated state of the blockchain as determined by the compliance node of the blockchain does not comply with the one or more compliance policies, sending an error message associated with the second transaction to a wallet client associated with the second transaction, wherein sending the error message causes the error message to be displayed.

2. The system of claim 1, wherein the machine-readable instructions that cause the computing device to emulate the first transaction to generate the emulated state of the blockchain further cause the computing device to at least:
    execute the first transaction using a blockchain virtual machine; and
    modify the current state of the blockchain to reflect a result of the first transaction.

3. The system of claim 2, wherein the machine-readable instructions that cause the computing device to determine that the first transaction complies with one or more compliance policies further causes the computing device to at least perform dynamic analysis of the execution of the first transaction while the first transaction is executed by the blockchain virtual machine.

4. The system of claim 1, wherein the machine-readable instructions that cause the computing device to determine that the first transaction complies with one or more compliance policies further causes the computing device to at least evaluate the emulated state of the blockchain to determine that the emulated state complies with the one or more compliance policies.

5. The system of claim 1, wherein the one or more compliance policies specify a prohibited address for the first transaction.

6. The system of claim 1, wherein the one or more compliance policies specify an allowable transaction amount.

7. A method, comprising:
    obtaining a first transaction for a blockchain;
    emulating, by a compliance node of the blockchain, execution of the first transaction based at least in part on a current state of the blockchain to generate an emulated state of the blockchain, wherein emulating execution of the first transaction includes causing the compliance node to access other nodes of the blockchain without utilizing a cached blockchain state;
    determining that the emulated state of the blockchain complies with one or more compliance policies;
    in response to determining that the emulated state of the blockchain as determined by the compliance node complies with the one or more compliance policies, forwarding the first transaction to a blockchain node for execution, wherein forwarding the first transaction causes the blockchain node to execute the first transaction;
    obtain a second transaction for the blockchain;
    emulate, by the compliance node, execution of the second transaction based at least in part on the current state of the blockchain, wherein emulating execution of the second transaction includes causing the compliance node to access the other nodes of the blockchain without utilizing the cached blockchain state;
    determine that the emulated state of the blockchain does not comply with the one or more compliance policies; and
    in response to a determination that the emulated state of the blockchain as determined by the compliance node does not comply with the one or more compliance policies, sending an error message associated with the second transaction to a wallet client associated with the second transaction, wherein sending the error message causes the error message to be displayed.

8. The method of claim 7, wherein emulating the first transaction to generate the emulated state of the blockchain further cause a computing device to at least:
    execute the first transaction using a blockchain virtual machine; and
    modify the current state of the blockchain to reflect a result of the first transaction.

9. The method of claim 8, wherein determining that the first transaction complies with one or more compliance policies further causes the computing device to at least perform dynamic analysis of the execution of the first transaction while the first transaction is executed by the blockchain virtual machine.

10. The method of claim 7, wherein determining that the first transaction complies with one or more compliance policies further comprises evaluating the emulated state of the blockchain to determine that the emulated state complies with the one or more compliance policies.

11. The method of claim 7, wherein the one or more compliance policies specify a prohibited address for the first transaction.

12. The method of claim 7, wherein the one or more compliance policies specify an allowable transaction amount.

13. A non-transitory, computer-readable medium, comprising machine-readable instructions that, when executed by a processor of a computing device, cause the computing device to at least:
- obtain a first transaction for a blockchain;
- emulate, by a compliance node of the blockchain, execution of the first transaction based at least in part on a current state of the blockchain to generate an emulated state of the blockchain, wherein emulating execution of the first transaction includes causing the compliance node to access other nodes of the blockchain without utilizing a cached blockchain state;
- determine that the emulated state of the blockchain complies with one or more compliance policies;
- in response to a determination that the emulated state of the blockchain as determined by the compliance node complies with the one or more compliance policies, forward the first transaction to a blockchain node for execution, wherein forwarding the first transaction causes the blockchain node to execute the first transaction;
- obtain a second transaction for the blockchain;
- emulate, by the compliance node, execution of the second transaction based at least in part on the current state of the blockchain, wherein emulating execution of the second transaction includes causing the compliance node to access the other nodes of the blockchain without utilizing the cached blockchain state;
- determine that the emulated state of the blockchain does not comply with the one or more compliance policies; and
- in response to a determination that the emulated state of the blockchain as determined by the compliance node does not comply with the one or more compliance policies, sending an error message associated with the second transaction to a wallet client associated with the second transaction, wherein sending the error message causes the error message to be displayed.

14. The non-transitory, computer-readable medium of claim 13, wherein the machine-readable instructions that cause the computing device to emulate the first transaction to generate the emulated state of the blockchain further cause the computing device to at least:
- execute the first transaction using a blockchain virtual machine; and
- modify the current state of the blockchain to reflect a result of the first transaction.

15. The non-transitory, computer-readable medium of claim 14, wherein the machine-readable instructions that cause the computing device to determine that the first transaction complies with one or more compliance policies further causes the computing device to at least perform dynamic analysis of the execution of the first transaction while the first transaction is executed by the blockchain virtual machine.

16. The non-transitory, computer-readable medium of claim 13, wherein the machine-readable instructions that cause the computing device to determine that the first transaction complies with one or more compliance policies further causes the computing device to at least evaluate the emulated state of the blockchain to determine that the emulated state complies with the one or more compliance policies.

17. The non-transitory, computer-readable medium of claim 13, wherein the one or more compliance policies specify a prohibited address for the first transaction.

* * * * *